United States Patent
Gullbrand et al.

(10) Patent No.: US 9,444,328 B2
(45) Date of Patent: Sep. 13, 2016

(54) ACOUSTIC NOISE MITIGATION USING PERIODICITY DISRUPTION

(75) Inventors: Jessica Gullbrand, Forest Grove, OR (US); Karthik Sankaranarayanan, Cumberland, RI (US); Willem M. Beltman, West Linn, OR (US); Eric Baugh, Portland, OR (US); Stephen H. Gunther, Beaverton, OR (US); Jay D. Schwartz, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 655 days.

(21) Appl. No.: 13/532,949

(22) Filed: Jun. 26, 2012

(65) Prior Publication Data

US 2013/0346764 A1 Dec. 26, 2013

(51) Int. Cl.
| | |
|---|---|
| *G06F 1/26* | (2006.01) |
| *H02M 1/44* | (2007.01) |
| *H02M 1/36* | (2007.01) |
| *G06F 1/32* | (2006.01) |

(52) U.S. Cl.
CPC .............. *H02M 1/44* (2013.01); *H02M 1/36* (2013.01); *G06F 1/3203* (2013.01)

(58) Field of Classification Search
CPC ........... G06F 1/3203; G06F 2209/483; G06F 1/3243
USPC .......................................................... 713/300
See application file for complete search history.

(56) References Cited

U.S. PATENT DOCUMENTS

| | | | | |
|---|---|---|---|---|
| 5,913,067 A | * | 6/1999 | Klein ............................ 713/300 |
| 6,067,631 A | * | 5/2000 | Choi ............................ 713/500 |
| 8,908,709 B1 | * | 12/2014 | Aybay ........................... 370/413 |
| 2003/0084353 A1 | * | 5/2003 | Chang et al. ................. 713/300 |
| 2004/0236975 A1 | * | 11/2004 | Gaskins et al. .............. 713/320 |
| 2004/0254688 A1 | * | 12/2004 | Chassin et al. .............. 700/295 |
| 2005/0125114 A1 | * | 6/2005 | Atmur ............................ 701/22 |
| 2006/0132109 A1 | * | 6/2006 | Rodriguez et al. ........... 323/282 |
| 2007/0053525 A1 | * | 3/2007 | Vyssotski et al. ........... 381/94.1 |
| 2008/0232604 A1 | * | 9/2008 | Dufresne et al. .............. 381/67 |
| 2008/0234935 A1 | * | 9/2008 | Wolf et al. .................... 701/216 |
| 2008/0274395 A1 | * | 11/2008 | Shuster ........................... 429/61 |
| 2009/0204830 A1 | * | 8/2009 | Frid et al. ..................... 713/322 |
| 2010/0107166 A1 | * | 4/2010 | Topaloglu ..................... 718/102 |
| 2010/0117579 A1 | * | 5/2010 | Culbert et al. ............... 318/471 |
| 2011/0066868 A1 | * | 3/2011 | Atkinson ...................... 713/323 |
| 2011/0078478 A1 | * | 3/2011 | Branover et al. ............ 713/323 |
| 2011/0254722 A1 | * | 10/2011 | Naiki ............................ 341/173 |
| 2012/0008626 A1 | * | 1/2012 | Brederveld et al. .......... 370/392 |
| 2012/0110351 A1 | * | 5/2012 | Raju et al. ................... 713/300 |
| 2012/0246506 A1 | * | 9/2012 | Knight ......................... 713/340 |
| 2012/0290143 A1 | * | 11/2012 | Stanczak et al. ............. 700/292 |
| 2013/0173946 A1 | * | 7/2013 | Rotem et al. ................ 713/340 |

* cited by examiner

*Primary Examiner* — Thomas Lee
*Assistant Examiner* — Volvick Derose
(74) *Attorney, Agent, or Firm* — Trop, Pruner & Hu, P.C.

(57) ABSTRACT

In one or more embodiments, a fixed time interval for a system is determined. The fixed time interval corresponds to time between clock ticks. A random time interval is determined based on the fixed time interval and an offset. One or more electronic components affixed to a motherboard are transitioned to a new power state when the random time interval has elapsed. By introducing a randomization to the timing element to a control signal that drives the power state transition, a periodicity for the system is disrupted. The disruption in periodicity mitigates acoustic noise generated by vibrations in electronic components and motherboards affected by current and/or voltage transitions.

19 Claims, 10 Drawing Sheets

ACOUSTIC NOISE MITIGATION USING PERIODICITY DISRUPTION

TECHNICAL FIELD

Embodiments relate to the mitigation of acoustic noise generated by architectural features in computing systems.

BACKGROUND

Developers and manufacturers of modern computing systems promote efficient use of computing resources. This is particularly true with regard to power consumption. For example, prolonging battery life is especially beneficial for mobile computing devices. As such, efficient and smart power management is an objective in the development and manufacturing of all types of computing systems.

DETAILED DESCRIPTION

Embodiments described herein relate to the mitigation of acoustic noise generated by architectural features in computing systems. Power management of electronic components involves power state transitions. For example, an electronic component may be transitioned from one power state to a power state of greater or less power. In accordance with one or more embodiments, a power state is defined according to the Advanced Configuration and Power Interface (ACPI) specification, the Advanced Power Management (APM) standard, or any other recognized power management scheme. In another embodiment, a power state includes any state of expected power consumption, such as a state of an electronic component or system that is to not exceed a maximum power consumption rating.

By being subject to these power state transitions, electronic components then experience current and/or voltage transitions which may cause the electronic components to vibrate. Further, these vibrations when transferred from the electronic components to a motherboard radiate an audible acoustic noise. When the acoustic noise falls within certain frequency ranges where the human ear is most sensitive (e.g., 1-6 kHz), the acoustic noise effect becomes audible. However, noise can also be audible and annoying at other frequencies. Moreover, when periodic transitions occur, the audible acoustic noise then takes on a tonal and annoying quality that is a detriment to the user experience.

In accordance with embodiments, acoustic noise mitigation may be executed in part by disrupting a periodicity in power state transitions for one or more electronic components in the system or for the system as a whole. In one or more embodiments, a system may be subject to constant acoustic noise mitigation as described herein. In one or more embodiments, a system may be subject to dynamic acoustic noise mitigation as described herein where the mitigation is initiated based on one or more conditions.

Figure 1:
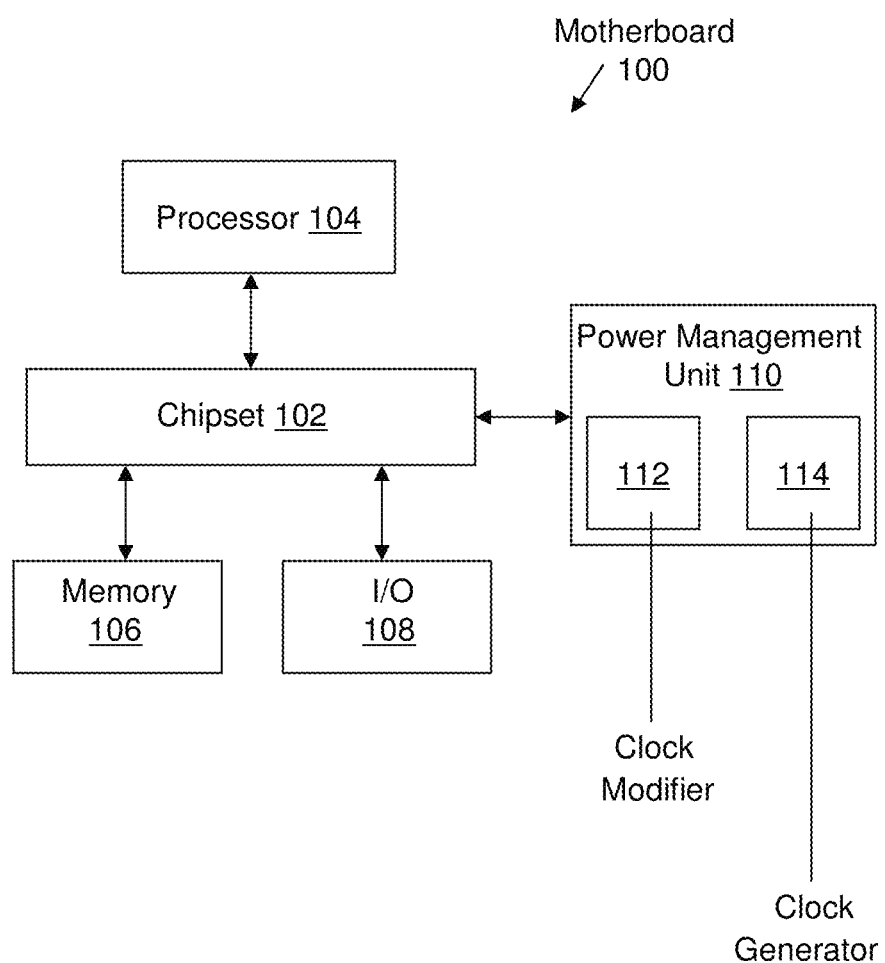
FIG. 1 is a block diagram of a system in accordance with one or more embodiments.

Referring now to FIG. 1, shown is a block diagram of a system in accordance with one or more embodiments. In particular, FIG. 1 shows a motherboard 100 with numerous electronic components 102-108 affixed to it. Specifically, the motherboard 100 is affixed with at least one chipset 102, at least one processor 104, memory devices/controllers 106, and input/output devices/controllers 108. While FIG. 1 shows the aforementioned electronic components 102-108 affixed to a motherboard 100, those skilled in the art will understand that other electronic components (e.g., capacitors, inductors, circuits, etc.) not shown in FIG. 1 may also be affixed to a motherboard 100. In accordance with one or more embodiments, electronic components 102-108 are configured to receive an electric current or voltage provided by a power supply (not shown). In receiving the electric current or voltage, an electronic component 102-108 may operate in one of many power states. Note that in an embodiment, one of the components may be a system-on-chip (SoC).

In accordance with one or more embodiments, the motherboard 100 is affixed with a power management unit 110 configured to manage the power states for electronic components 102-108. Specifically, the power management unit 110 may provide a control signal that specifies a target power state for transitioning an electronic component to as well as a timing element for when the power state transition should occur. In some embodiments, a clock generator 114 for the power management unit 110 generates one or more control signals as described here.

In accordance with one or more embodiments, a clock modifier 112 for the power management unit 110 may intercept the control signal provided by the clock generator 114 and modify the timing element for the control signal. Once the control signal is modified, the control signal is transmitted from the power management unit 110 to one or more electronic components 102-108. Upon receipt of the modified control signal, the electronic components 102-108 are transitioned to the target power state at a determined time as specified by the modified control signal.

As shown above in accordance with one or more embodiments, the power management unit 110 and its included functionality (e.g., clock generator 114 and clock modifier 112) may be implemented as a component affixed to a motherboard 100 that is separate and distinct from a processor 104. However, one skilled in the art will appreciate that the power management functionality may be implemented internal to the processor 104 or some other electronic component in accordance with other embodiments.

Figure 2:
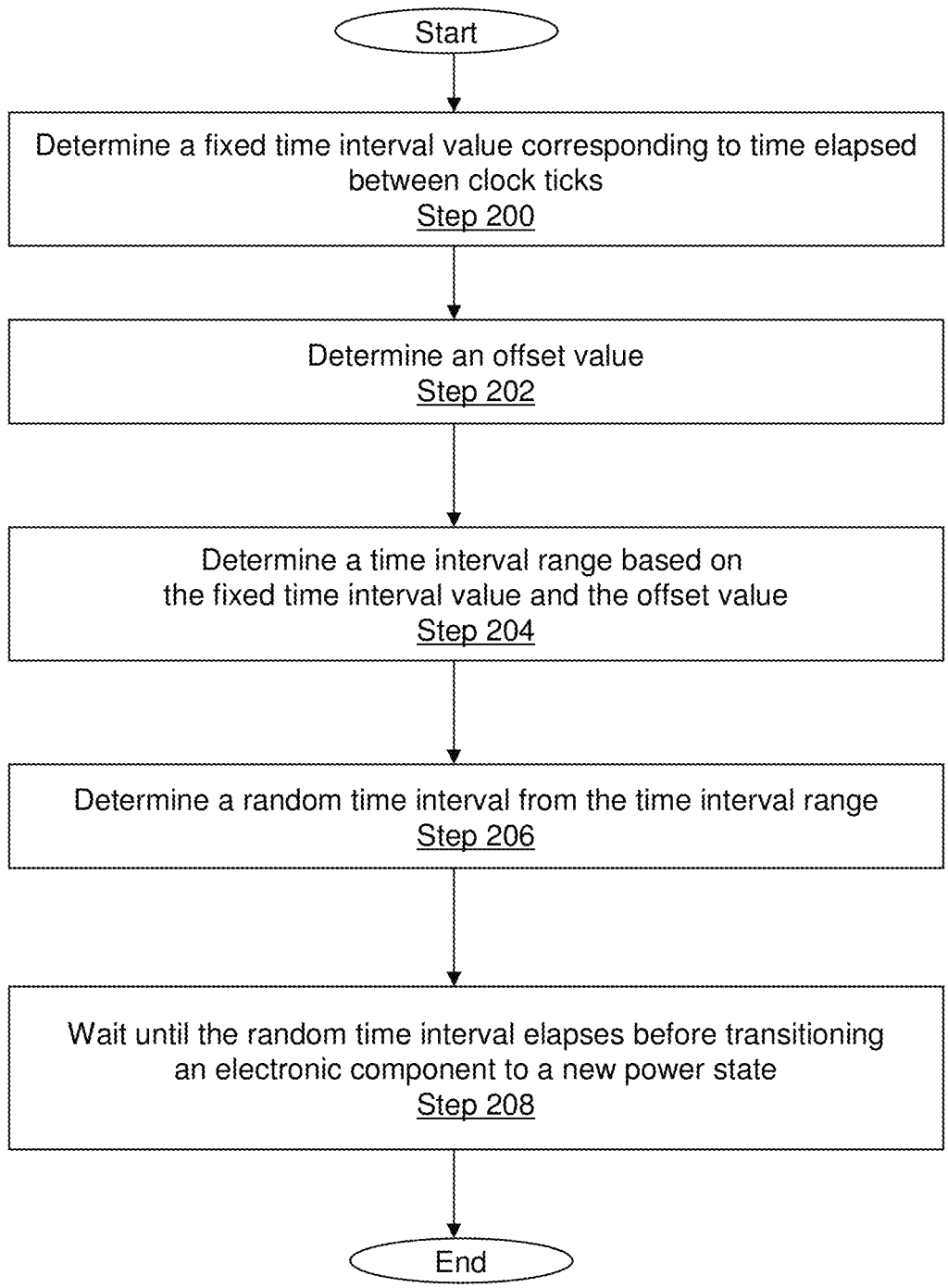
FIG. 2 is a flow diagram of a method in accordance with one or more embodiments.

Referring now to FIG. 2, shown is a flow diagram of a method in accordance with some embodiments. The method shown in FIG. 2 may be performed by a clock modifier 112 as described in relation to FIG. 1. Further, the method is applicable to both hardware and software timers and their corresponding interrupt provisions.

Beginning with Step 200, a fixed time interval value corresponding to the time elapsed in between clock ticks is determined. As such, the fixed time interval is the basis for power state transitions that enable electronic components 102-108 to switch from high power to low power and vice versa. By operating pursuant to the fixed time interval, the system of FIG. 2 and all of the included electronic components operate with a periodicity.

In Step 202, an offset value is determined. In one or more embodiments, the offset value is a defined time constant (e.g., based on a calculation, set by a system developer or administrator, etc.). In one or more embodiments, the offset value may be determined based on the fixed time interval value. For example, the offset value may be defined as some set percentage of the fixed time interval value. Accordingly, in some embodiments, when the fixed time interval is modified (e.g., by the system's administrator), the offset value is also modified accordingly.

In Step 204, a time interval range is determined based on the fixed time interval value and the offset value. In one or more embodiments, the bounds of the time interval range are determined by adding the offset value to and subtracting the offset value from the fixed time interval (i.e., fixed time interval +/− offset value). For example, if the fixed time interval value is 10x and the offset value is determined to be 2x, then the time interval range's lower bound is 8x and the time interval range's upper bound is 12x.

In Step 206, a random time interval value is determined from the time interval range. In other words, the random time interval value falls within the time interval range. In one or more embodiments, a random number generator receives the time interval range as an input and provides the random time interval value as an output. In accordance one or more embodiments, the random time interval value is used by a clock modifier 112 to modify a timing element for one or more control signals provided by a clock generator 114.

Figure 3A:
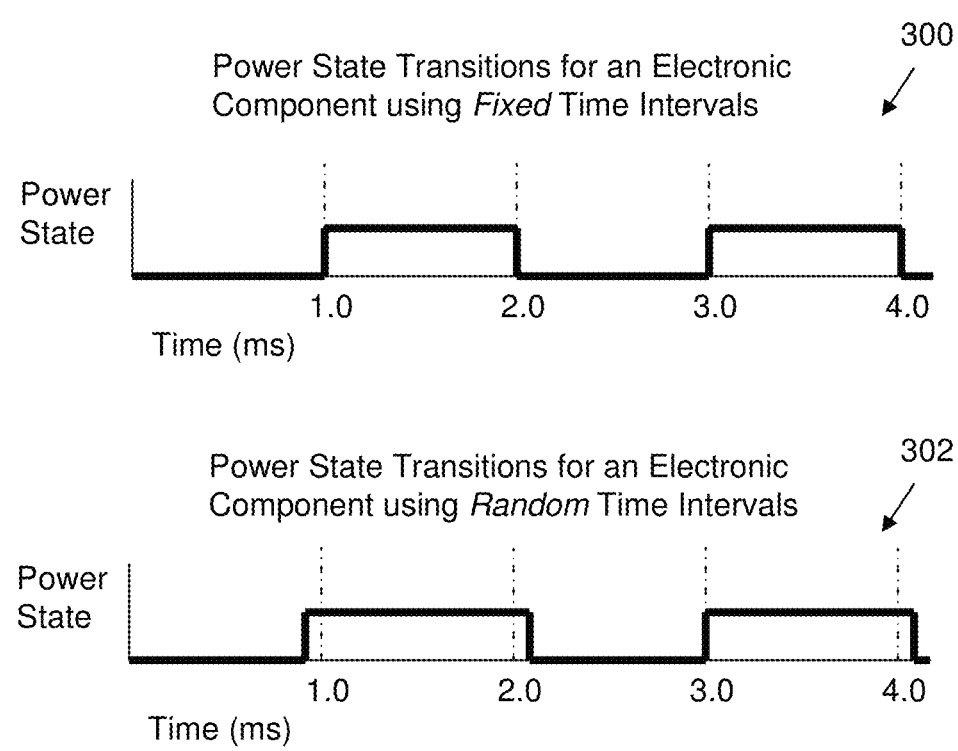
FIGS. 3a-3c are graphs illustrating use of a system in accordance with one or more embodiments.

In Step 208, after the random time interval elapses, an electronic component 102-108 is transitioned to a new power state. In one or more embodiments, this is caused by the power management unit 110 transmitting the modified control signal to the electronic component 102-108. The effect of introducing the randomization aspect into the power state transitions (e.g., by virtue of the modified control signal), is to disrupt the periodicity of power state transitions found in traditional systems. FIG. 3a shows an illustration of this periodicity disruption.

Referring now to FIG. 3a, shown are graphs illustrating use of a system in accordance with some embodiments. Graph 300 plots power state transitions against time (in milliseconds) for a computing system using traditional periodicity. That is, the electronic components are transitioned to different power states using only fixed and uniform time intervals. For purposes of this discussion, each time interval is exactly 1.0 millisecond (ms). Turning to the graph, an electronic component is in an inactive power state from 0.0 to 1.0 ms. At 1.0 ms, the electronic component is transitioned to a higher power state. From 1.0 to 2.0 ms, the electronic component is in a higher power state. At 2.0 ms, the electronic component is transitioned to an inactive power state. From 2.0 to 3.0 ms, the electronic component is in a lower power state. At 3.0 ms, the electronic component is transitioned to a higher power state. From 3.0 to 4.0 ms, the electronic component is in a higher power state. At 4.0 ms, the electronic component is transitioned to a lower power state. Because of the fixed time intervals used in the power state transitions, the computing system and its electronic components exhibit periodicity.

In contrast, graph 302 plots power state transitions against time (in ms) for a system where periodicity is disrupted. That is, the electronic components are transitioned to different power states using randomized and therefore non-uniform time intervals. For purposes of this example, assume that the randomized time intervals deviate from the 1.0 ms fixed time interval value. Turning to graph 302, an electronic component is in a low power state from 0.0 to 0.9 ms. At 0.9 ms, the electronic component is transitioned to a higher power state. From 0.9 to 2.1 ms, the electronic component is in a higher power state. At 2.1 ms, the electronic component is transitioned to a lower power state. From 2.1 to 3.0 ms, the electronic component is in a lower power state. At 3.0 ms, the electronic component is transitioned to a lower power state. From 3.0 to 4.1 ms, the electronic component is in a higher power state. At 4.1 ms, the electronic component is transitioned to a lower power state. Because of the randomized and non-uniform time intervals used by the power management unit 110 in signaling power state transitions, the computing system and its electronic components do exhibit a disrupted periodicity. Further, in accordance with one or more embodiments, the random time intervals, when taken together, will maintain a mean of the fixed time interval. As such, the system benefits from a similar duty cycle and retains a similar level productivity even though the acoustic noise mitigation measure provides for non-fixed and irregular time intervals due to the randomization aspect. A benefit of non-periodic power state transitions is discussed in relation to FIGS. 3b and 3c. In other embodiments, the randomization intervals may not be symmetric (for waking up early and staying up longer), leading to an offset of the new mean time interval.

Figure 3B:
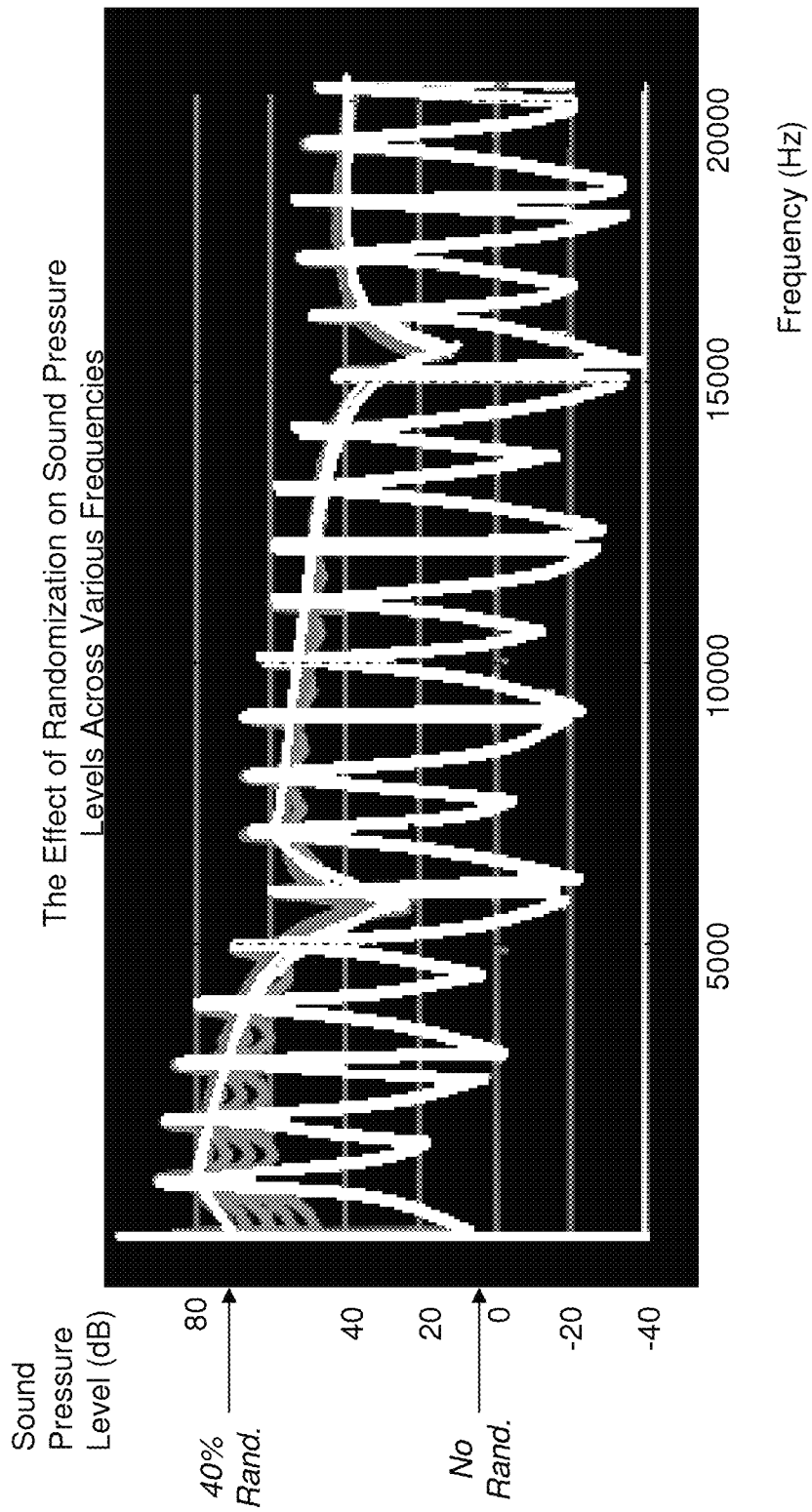

Referring now to FIG. 3b, shown is a graph illustrating use of a system in accordance with some embodiments. The graph shown in FIG. 3b plots sound pressure level in decibels (dB) against frequency in hertz (Hz) for various systems with differentiable randomization with respect to timing intervals. For purposes of discussion, randomization is expressed as a percentage deviation. So, for example, x % randomization with respect to a fixed value (e.g., a timing interval) means that a random value will be selected from a range that deviates both downward and upward from the fixed value by x %. To provide a concrete example, 5% randomization of 1.00 means the range from which a value will be randomly selected is 0.95-1.05. Sound pressure level data has been collected from systems using 0% randomization (i.e., complete periodicity due to no deviation from a fixed time interval), 2.5% randomization, 5.0% randomization, 10% randomization, 20% randomization, and 40% randomization.

For purposes of discussion, randomization is expressed as a percentage deviation. So, for example, x % randomization with respect to a fixed value (e.g., a timing interval) means that a random value will be selected from a range that deviates both downward and upward from the fixed value by x %. To provide a concrete example, 5% randomization of 1.00 means the range from which a value will be randomly selected is 0.95-1.05.

FIG. 3b shows that as the randomization increases so does the breadth of the time interval range increase, thereby allowing for an increasing amount of deviation from the fixed time interval. The sound pressure level data for 0% randomization ("No Rand." as shown in the graph) and 40% randomization ("40% Rand." as shown in the graph) have been plotted in black. Data from systems using intermediate measures of randomization (i.e., 2.5%, 5%, 10%, and 20%) are plotted on this graph in gray.

In comparing the data for various randomization levels as shown in the graph of FIG. 3b, it is clear that the plotting for 0% randomization (i.e., no disrupted periodicity, no acoustic noise mitigation) yields the sharpest changes in frequency as evidenced by its comparatively higher peaks and lower valleys. With respect to acoustic noise, this yields a more tonal sound that is detrimental to the user experience. In contrast, introducing randomization to disrupt the periodicity yields a progressively smoother plotting as seen by the gray-plotted data corresponding to 2.5%, 5%, 10%, and 20% randomization and the black-plotted data corresponding to 40% randomization. In other words, the introduction of randomization (i.e., the disruption of periodicity) relates to less abrupt changes in sound pressure levels. With respect to acoustic noise, this yields a less tonal sound and therefore an improved user experience.

Figure 3C:
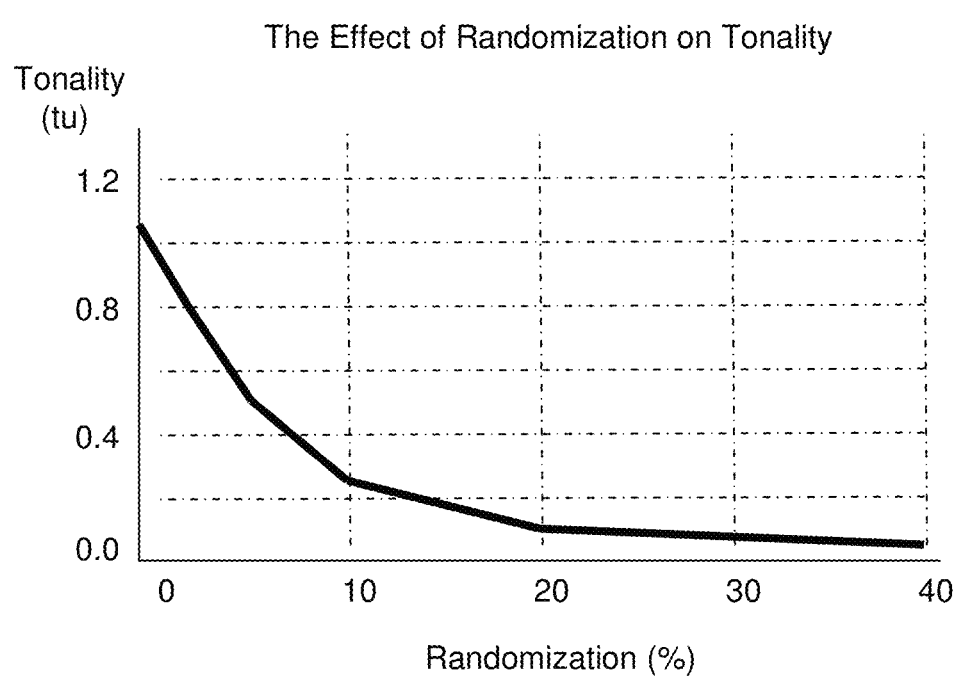

This is further reflected in FIG. 3c, which shows a graph charting tonality (in tu) against randomization. In general, the graph shows that tonality decreases as randomization increases. A reduction in tonality improves user experience and is beneficial.

As discussed herein, randomization is used to determine time intervals for power state transitions. In some embodiments, pseudo-randomization may be applied to achieve the same effect.

Figure 4:
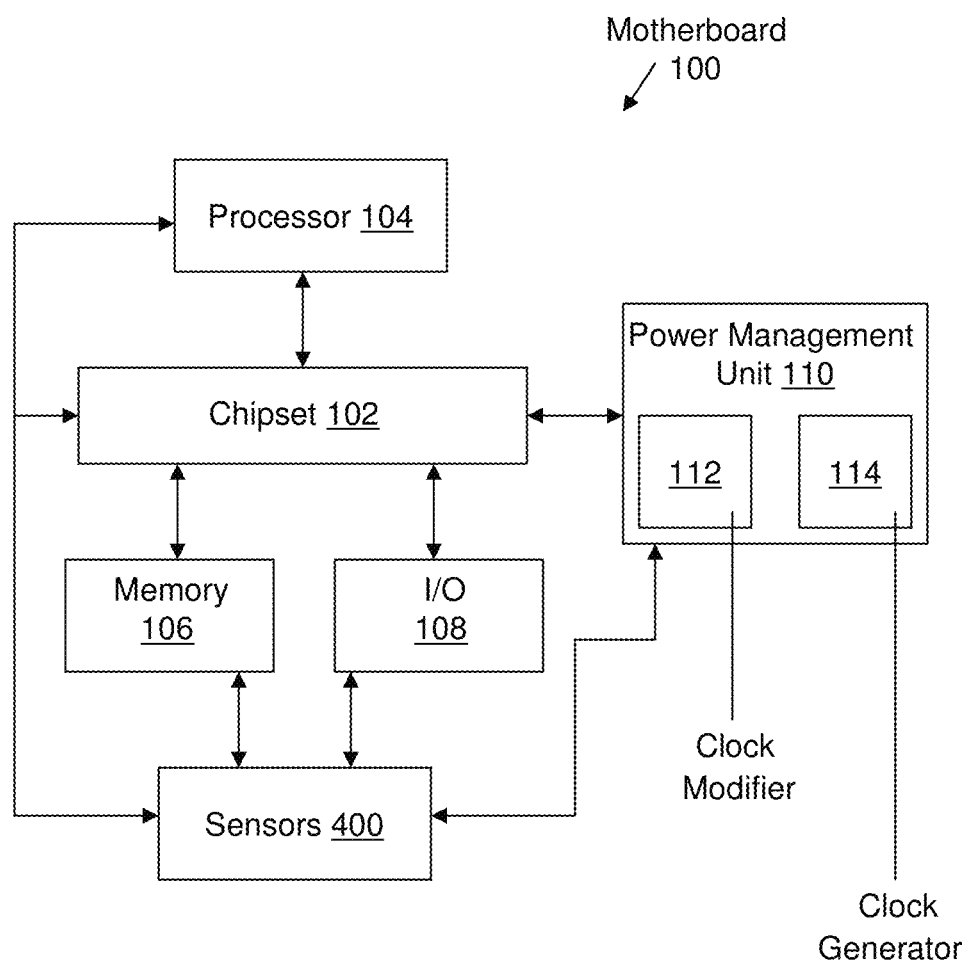
FIG. 4 is a block diagram of a system in accordance with one or more embodiments.

Referring now to FIG. 4, shown is a block diagram of a system in accordance with some embodiments. The system shown in FIG. 4 is similar to the system of FIG. 1 in that there is motherboard 100 with numerous electronic components 102-108 affixed to it. As with FIG. 1's system, the motherboard 100 may be affixed with at least one chipset 102, at least one processor 104, memory devices/controllers 106, and input/output devices/controllers 108. Further, a power management unit 110 is shown affixed to the motherboard 100 to manage the power states of electronic components 100-108. In addition, the system of FIG. 4 is shown to include one or more sensors 400.

In accordance with one or more embodiments, a sensor 400 may be used to obtain an acoustic noise measurement. In some embodiments, an acoustic noise measurement may be a frequency measurement, a vibration measurement, a tonality measurement, a sound pressure level measurement, a current transition, a voltage transition, and or any other quantitative measure of acoustic noise. As such, a sensor 400 may be a microphone, a vibration sensor, or any other device configured to obtain a quantitative acoustic noise measurement.

In some embodiments, an acoustic noise measurement may be obtained quantitatively (e.g., as a numerical value as described here) but then processed and classified as a qualitative value. For example, as discussed in relation to FIG. 3c, a tonality measurement may be made quantitatively (e.g., in units of tu) but then classified qualitatively. In other embodiments, the acoustic noise measurement may be obtained qualitatively.

In embodiments where a microphone is used, the acoustic noise may be sampled and then processed to filter out routine noises (e.g., fan, hard disk, etc.) that are standard to computing systems. Accordingly, in such embodiments, the architectural noises caused by vibrations in electronic components 102-108 and motherboards 100 may be isolated and subsequently used as the basis of further determinations (e.g., as discussed in relation to FIG. 5). For example, once the sampled acoustic noise is filtered, the filtered acoustic noise may be characterized with regard to frequency, tonality, sound pressure level, and/or other quantitative characteristics for purposes of comparison with various threshold levels.

As shown in FIG. 4, a sensor 400 may be coupled to any and all of the electronic components 102-108 affixed to a motherboard 100. Additionally, a sensor 400 may itself be affixed to a motherboard 100. As such, sensors 400 may detect and obtain measurements for acoustic noise caused by vibrations in electronic components 102-110 from when the electronic components are subject to a current and/or voltage transition. Further, sensors 400 may detect and obtain measurements for acoustic noise generated when the aforementioned vibrations in electronic components 102-110 are transferred to a motherboard 100 such that the vibrating motherboard radiates additional acoustic noise.

In accordance with embodiments, the acoustic noise measurement obtained using a sensor 400 may be provided as input to the power management unit 110. Specifically, in one or more embodiments, a clock modifier 112 for a power management unit 110 may receive the acoustic noise measurement input and use it to make a determination as to whether control signals provided by the clock generator 114 should be modified to disrupt periodicity. This is further discussed in relation to FIG. 5.

Figure 5:
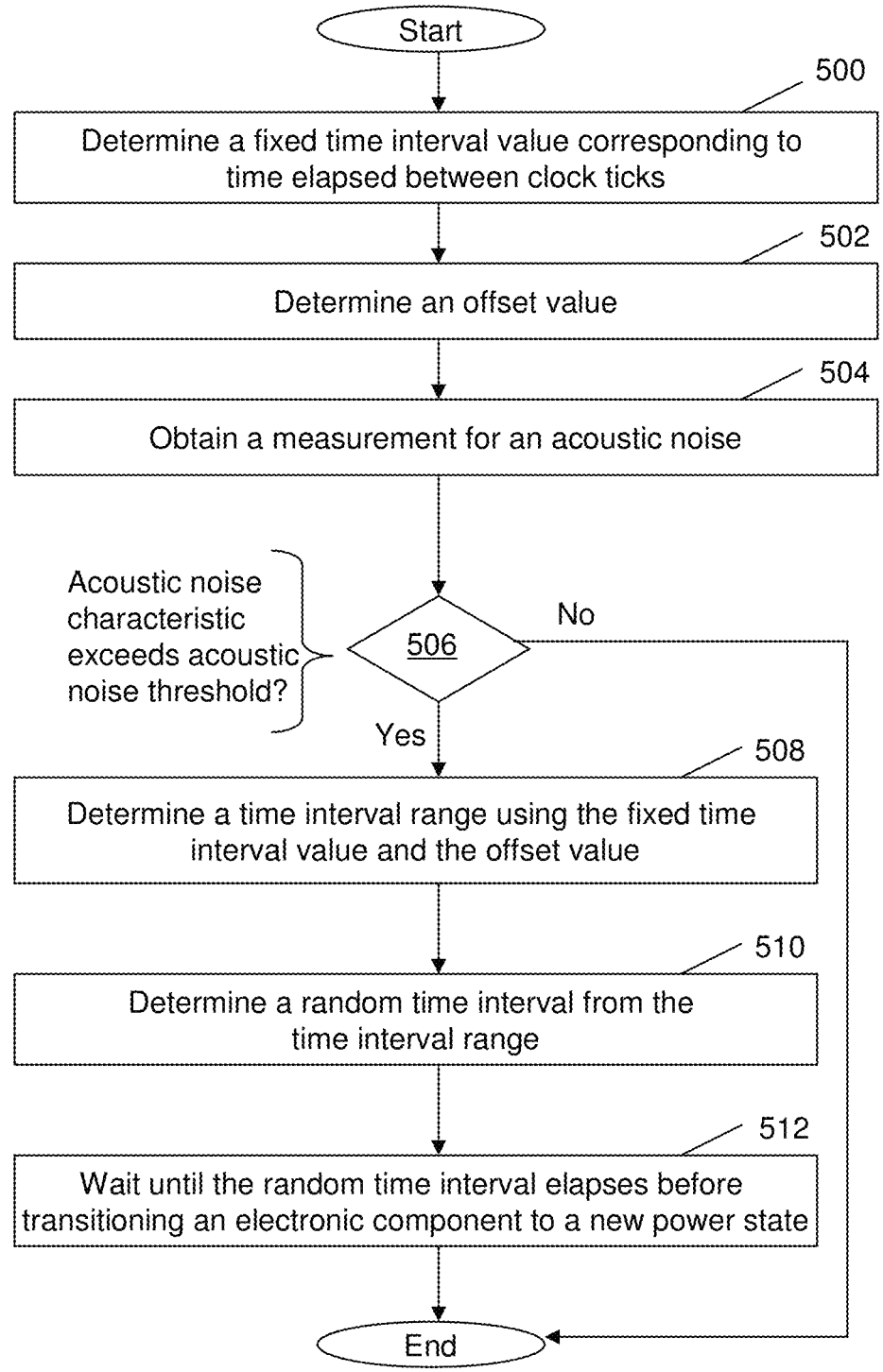
FIG. 5 is a flow diagram of a method in accordance with one or more embodiments.

Referring now to FIG. 5, a flow diagram of a method in accordance with some embodiments. The method shown in FIG. 5 may be performed by a clock modifier 112 as described in relation to FIG. 4.

Beginning with Step 500, a fixed time interval value is determined corresponding to the time elapsed in between clock ticks.

In Step 502, an offset value is determined. As discussed in relation to Step 202 of FIG. 2, the offset value may be determined based on the fixed time interval value. For example, the offset value may be defined as some set percentage of the fixed time interval value. Accordingly, when the fixed time interval is modified (e.g., by the system's administrator), the offset value is also modified accordingly. In another embodiment, the offset value may be a value set as a constant by the system's manufacturer/developer.

Additionally, in yet another embodiment, the offset value may be determined dynamically based on acoustic noise sampled by sensors. The offset value may be set based on one or more characteristics of the sampled acoustic noise including, but not limited to, frequency, vibration, tonality, current transitions, voltage transitions, and sound pressure level. As such, the offset value used for acoustic noise mitigation may change over time as the characteristic(s) of the acoustic noise changes. For example, in some embodiments, a higher offset may be used when the frequency for the sampled acoustic noise is in frequency ranges most sensitive to human ears (e.g., 1-6 kHz). Because the use of a higher offset value yields higher randomization levels, a higher offset value is more conducive to disrupting periodicity in a computing system. This may be particularly useful when the frequency for the acoustic noise is in those ranges that are sensitive to human ears. Conversely, in some embodiments, a lower offset may be used when the frequency for the sampled acoustic noise is outside of sensitive frequency ranges. That is to say, comparatively less randomization and therefore comparatively less disruption of periodicity may be applied when the acoustic noise is not as detrimental to the user experience.

In Step 504, an acoustic noise measurement is obtained. In some embodiments, the acoustic noise measurement is obtained using sensors as discussed in relation to FIG. 4. The measured acoustic noise may originate from the electronic components 102-108. The measured acoustic noise may originate from the motherboard 100 as the motherboard 100 receives vibrations from the electronic components affixed to it. In some embodiments, the acoustic noise measurement obtained is quantitative. For example, the acoustic noise may be sampled and characterized on the basis of frequency (e.g., kHz), vibration (e.g., m), tonality (e.g., tu), current transitions (e.g., A), voltage transitions (e.g., V), sound pressure level (e.g., dB), and other quantitative/numerical characteristics.

In addition, acoustic noise may be sampled but then qualitatively characterized in accordance with some embodiments. In an embodiment, a quantitative characterization may be determined first (e.g., as described above) but then a qualitative classification step is performed. For example, a quantitative tonality characterization may be determined for sampled acoustic noise which is then classified using human perception (e.g., as discussed in relation to FIG. 3c).

In Step 506, a determination is made as to whether the acoustic noise exceeds an acoustic noise threshold. In some embodiments, a numerical acoustic noise characteristic (e.g., a measured tonality value, a measured frequency value, a measured sound pressure level value, a voltage difference, a current difference or a vibration magnitude, etc.) determined from sampled acoustic noise is compared with an appropriate numerical threshold value (e.g., a tonality threshold value, a frequency threshold value, a sound pressure level threshold value, a voltage difference, a current difference or a vibration magnitude, etc.). In some embodiments, the acoustic noise threshold may be a complex expression such as a mathematical expression that describes or models human perception. For example, a complex expression may include several comparisons of several values (e.g., like a Boolean expression) as opposed to a single comparison of one measured value versus one threshold value. For example, a complex expression may assume the form: (tonality measurement>tonality threshold) AND ((frequency measurement>frequency threshold) OR (sound pressure level measurement>sound pressure level threshold)). However, one skilled in the art will understand that a complex expression for an acoustic noise threshold may include any combination of Boolean operators and measurement and threshold values and variables. In addition, complex expressions as discussed herein may also incorporate comparisons that are qualitative. For instance, a complex expression may include a comparison between a characterized tonality measurement and a qualitative tonality threshold (e.g., as discussed in relation to FIG. 3c).

If the characteristic of the acoustic noise exceeds that of the acoustic noise threshold, then acoustic noise mitigation is required as discussed in Steps 508-512. Otherwise, if the characteristic of the acoustic noise does not exceed that of the acoustic noise threshold, then mitigation may not be performed at this time and the process as shown in FIG. 5 ends. Further discussion for the non-mitigation case is provided below following the discussion of Steps 508-512.

In Step 508, a time interval range is determined based on the fixed time interval value and the offset value. As discussed in relation to Step 204 of FIG. 2, the time interval range is the fixed time interval plus/minus the offset value.

In Step 510, a random time interval value is determined from the time interval range. In other words, the random time interval value falls within the time interval range. In one or more embodiments, a random number generator receives the time interval range as an input and provides the random time interval value as an output.

In Step 512, after the random time interval elapses, an electronic component is transitioned to a new power state. The effect of introducing the randomization aspect into the power state transitions, as signaled by the power management unit, is to disrupt the periodicity of power state transitions found in traditional systems.

The determination made at Step 506 resulting in subsequent Steps 508-512 is illustrative of how acoustic noise mitigation may be dynamic and performed on-the-fly (e.g., in contrast to the more constant mitigation discussed in relation to FIG. 2). However, it is possible that the determination at Step 506 will indicate that mitigation may not be performed (i.e., the acoustic noise does not exceed the acoustic noise threshold). If mitigation is not performed, then Steps 508-512 are not performed. Rather, a fixed time interval is used with respect to the sending of control signals from the power management unit. As such, there is no random timing element is introduced by the clock modifier 112 to the control signal provided by the clock generator 114. Because the control signals are periodic and therefore evidence uniform timing intervals, the result is that the periodicity of current and/or voltage transitions for the electronic components is maintained.

The discussion relating to the previous figures details how a clock modifier 112 may be implemented in a power management unit 110 affixed to a motherboard 100. As such, the acoustic noise mitigation measures discussed may be implemented using a hardware resource. Specifically, the power management unit 110 and its clock modifier 112 and clock generator 114 may be implemented in hardware. Additionally, similar acoustic noise mitigation measures may be implemented in software. For example, an operating system or some other embedded system or process may include one or more software-implemented timers (e.g., programmable interval timer, high precision event timer, etc.). As such a clock modifier may be implemented in software to intercept the control signal/interrupt generated by the aforementioned software-implemented timers. Once the control signal/interrupt is intercepted, the clock modifier may use similar steps as discussed in relation to the previous figures to introduce a random time aspect to the timing element of the control signal/interrupt. In this way, the periodicity of the system and its components may be disrupted to mitigate generated acoustic noise. A software-driven acoustic noise mitigation scheme may be constant (e.g., as discussed in relation to FIG. 2) or dynamic (e.g., as discussed in relation to FIG. 5). Further, acoustic noise mitigation measures as described herein may also be utilized with respect to interrupts received from external devices.

Figure 6:
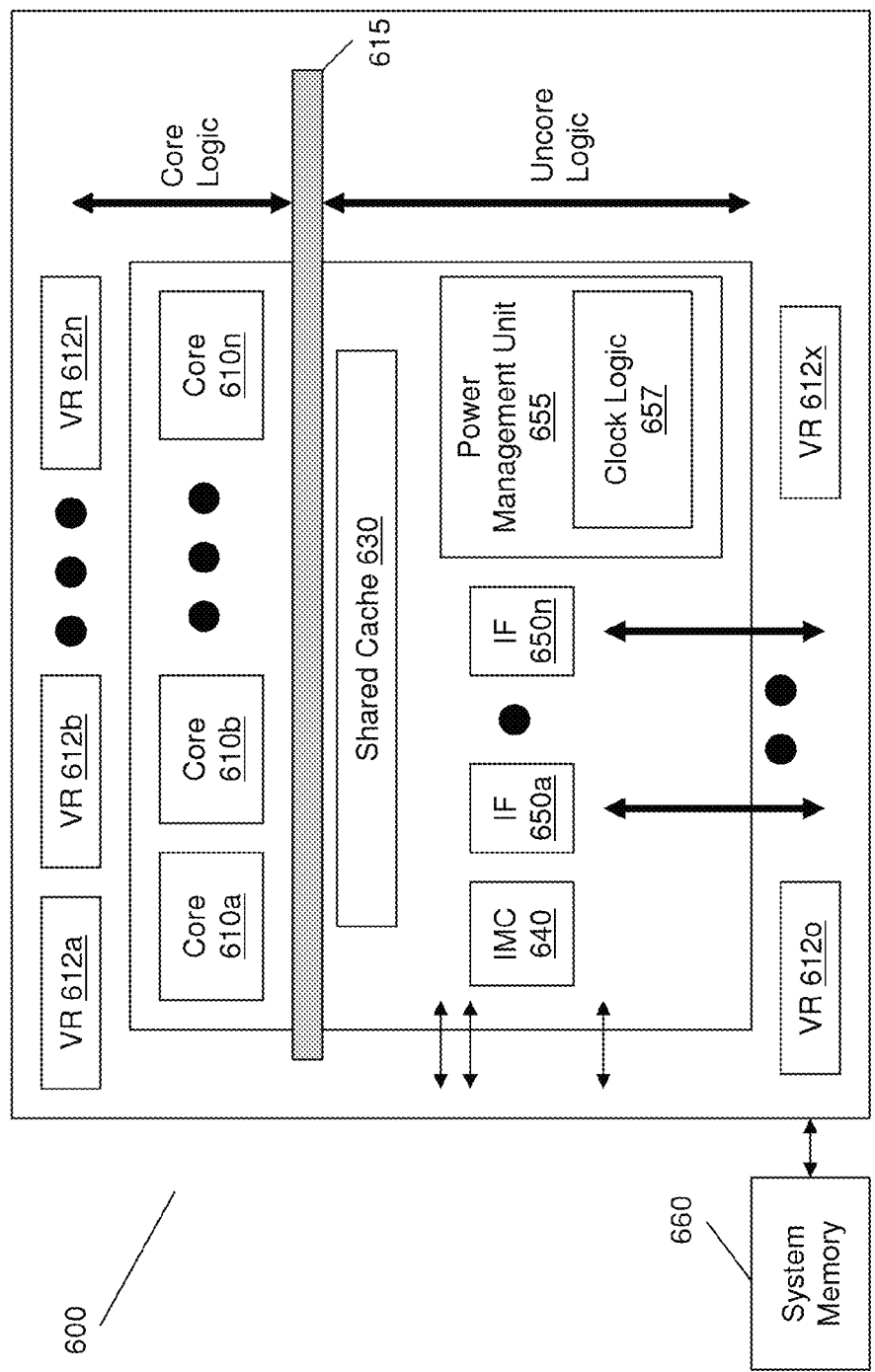
FIG. 6 is a block diagram of a system in accordance with one or more embodiments.

Referring now to FIG. 6, shown is a block diagram of a processor in accordance with one or more embodiments. As shown in FIG. 6, processor 600 may be a multicore processor including a plurality of cores 610a-610n. In one embodiment, each such core may be configured to operate at multiple voltages and/or frequencies. In addition, each core may be independently controlled to operate at a selected voltage and/or frequency as discussed in relation to previous figures. To this end, each core may be associated with a corresponding voltage regulator 612a-612x. The various cores may be coupled via an interconnect 615 to an uncore logic that includes various components. As seen, the uncore logic may include a shared cache 630 which may be a last level cache. In addition, the uncore logic may include an integrated memory controller 640, various interfaces 650 and a power management unit 655.

In various embodiments, power management unit 655 may include clock logic 657 that in one embodiment may execute firmware to realize the algorithms set forth in FIGS. 2 and 5. Specifically, the clock logic 657 shown in FIG. 6 may include a clock generator 114 and clock modifier 112 as discussed in relation to FIGS. 1 and 4. In this way the clock logic 657 can disrupt the periodicity of power state transitions (e.g., as discussed in relation to the previous figures, particularly FIGS. 2 and 5) for one or more electronic components coupled in the same system with the processor 600.

With further reference to FIG. 6, processor 600 may communicate with a system memory 660, e.g., via a memory bus. In addition, by interfaces 650, connection can be made to various off-chip components such as peripheral devices, mass storage and so forth. While shown with this particular implementation in the embodiment of FIG. 6, the scope of the various embodiments discussed herein is not limited in this regard.

Figure 7:
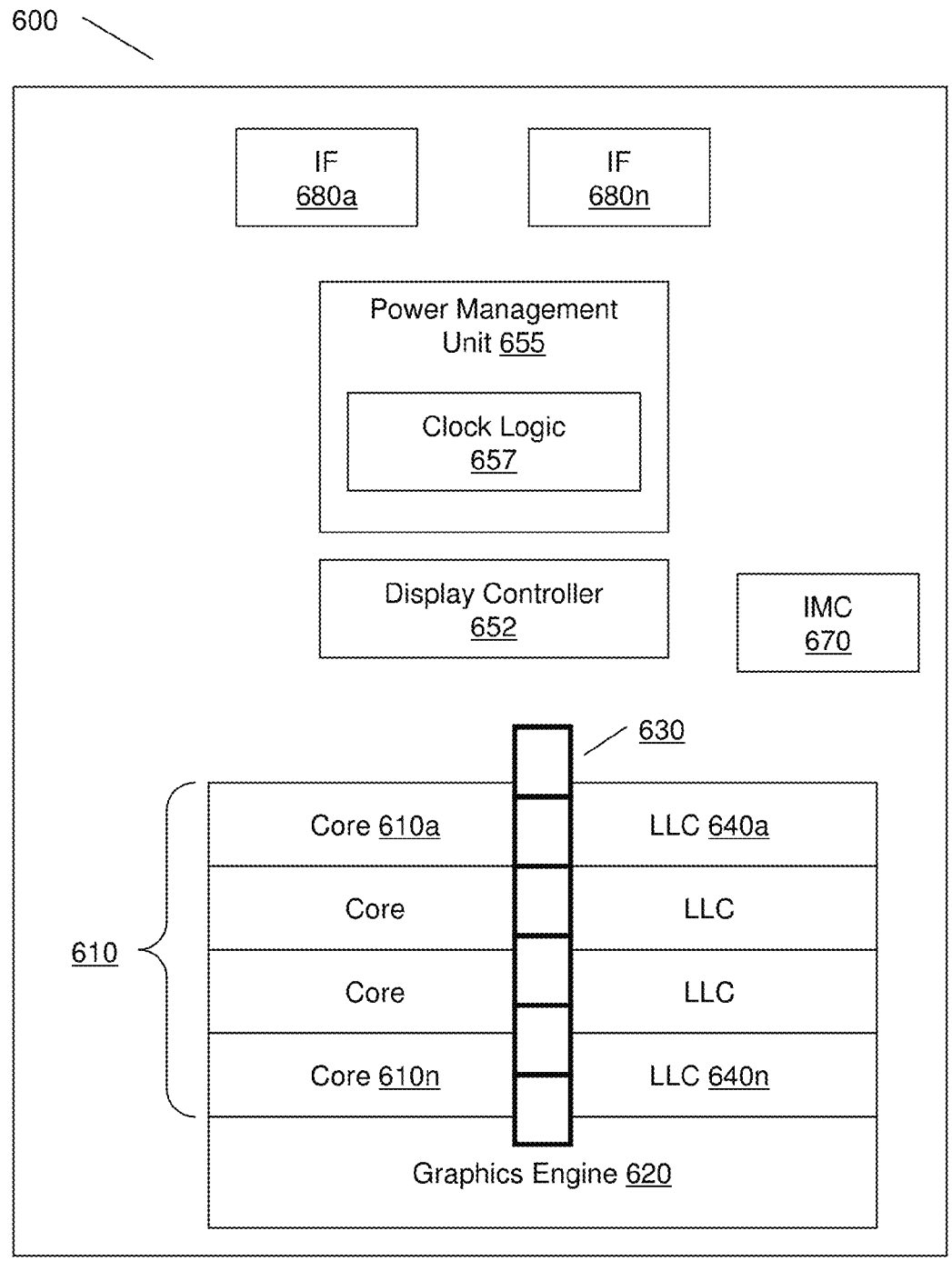
FIG. 7 is a block diagram of a system in accordance with one or more embodiments.

Referring now to FIG. 7, shown is a block diagram of a multicore processor 600 in accordance with some embodiments. As shown in the embodiment of FIG. 7, processor 600 includes multiple domains. Specifically, a core domain 610 can include a plurality of cores 610a-610n. A graphics domain 620 can include one or more graphics engines. In various embodiments, the multicore processor 600 may further include a power management unit 655 to handle power control events and power management such that individual units of domains 610 and 620 such as cores and/or graphics engines can be controlled to independently dynamically operate at an appropriate turbo mode frequency in light of the activity (or inactivity) occurring in the given unit. Each of domains 610 and 620 may operate at different voltage and/or power, and furthermore the individual units within the domains each may operate at an independent frequency and voltage. Note that while only shown with two domains, understand that embodiments are not limited in this regard and additional domains can be present.

In general, each core 610 may further include low level caches (LLC) in addition to various execution units and additional processing elements. In turn, the various cores may be coupled to each other and to a shared cache memory formed of a plurality of units of a LLC 640a-640n. In various embodiments, LLC 640 may be shared amongst the cores and the graphics engine, as well as various media processing circuitry. As seen, a ring interconnect 630 thus couples the cores together, and provides interconnection between the cores, and graphics domain 620.

As further seen, the multicore processor 600 may include a display controller 652 which may provide control of and an interface to an associated display. As further seen, the multicore processor 600 may include a power management unit 655 which can include clock logic 657 in accordance with some embodiments to disrupt the periodicity of power state transitions (e.g., as discussed in relation to the previous figures, particularly FIGS. 2 and 5) for one or more electronic components coupled in the same system with the processor 600. In various embodiments, this logic may execute the algorithm described above in FIGS. 2 and 5. As discussed, the aforementioned logic may be used in relation to any electronic component coupled to a system described in the figures disclosed herein. For example, this logic may be applied to transition processing cores from one power state to another based on a random or pseudo-random time interval in relation to a core clock. Further, this logic may be applied to transition other electronic components (i.e., apart from processing cores) found in a computing system at large. As such, the logic may be applied in relation to a non-core clock or timer.

As further seen in FIG. 7, processor 600 can further include an integrated memory controller (IMC) 670 that can provide for an interface to a system memory, such as a dynamic random access memory (DRAM). Multiple interfaces 680a through 680n may be present to enable interconnection between the processor and other circuitry. For example, in one embodiment at least one direct media interface (DMI) interface may be provided as well as one or more Peripheral Component Interconnect Express (PCIe™) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the various embodiments discussed herein is not limited in this regard.

Figure 8:
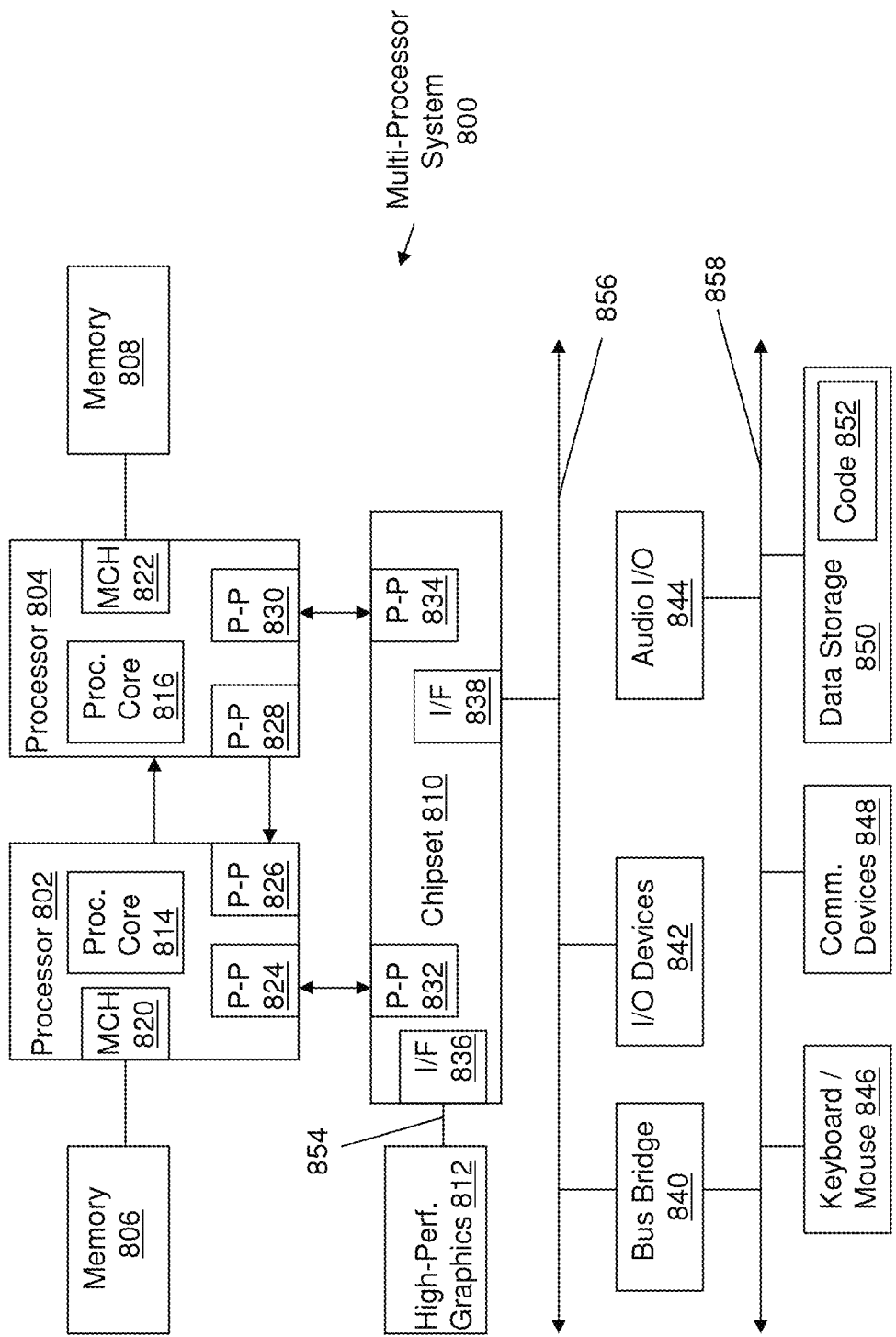
FIG. 8 is a block diagram of a system in accordance with one or more embodiments.

Referring now to FIG. 8, shown is a block diagram of a system in accordance with some embodiments. As shown in FIG. 8, a multiprocessor system 800 is a point-to-point interconnect system, and includes a first processor 802 and a second processor 804 coupled via a point-to-point interconnect. As shown in FIG. 8, each of processors 802 and 804 may be multicore processors, including first and second processor cores (i.e., processor cores 814 and 816), although potentially many more cores may be present in the processors.

Still referring to FIG. 8, first processor 802 further includes a memory controller hub (MCH) 820 and point-to-point (P-P) interfaces 824 and 826. Similarly, second processor 804 includes a MCH 822 and P-P interfaces 828 and 830. As shown in FIG. 8, MCH's 820 and 822 couple the processors to respective memories, namely a memory 806 and a memory 808, which may be portions of system memory (e.g., DRAM) locally attached to the respective processors. First processor 802 and second processor 804 may be coupled to a chipset 810 via P-P interconnects 824 and 830, respectively. As shown in FIG. 8, chipset 810 includes P-P interfaces 832 and 834.

Furthermore, chipset 810 includes an interface 836 to couple chipset 810 with a high performance graphics engine 812 by a P-P interconnect 854. In turn, chipset 810 may be coupled to a first bus 856 via an interface 838. As shown in FIG. 8, various input/output (I/O) devices 842 may be coupled to first bus 856, along with a bus bridge 840 which couples first bus 856 to a second bus 858. Various devices may be coupled to second bus 858 including, for example, a keyboard/mouse 846, communication devices 848 and a data storage unit 850 such as a disk drive or other mass storage device which may include code 852, in one embodiment. Further, an audio I/O 844 may be coupled to second bus 858. Embodiments can be incorporated into other types of systems including mobile devices such as a smart cellular telephone, tablet computer, netbook, ultrabook, notebooks, laptops, or so forth. Further, embodiments can be incorporated into stationary devices such as workstations, desktop computers, or so forth.

The features described above in relation to FIG. 8 may be considered examples of electronic components. Further, these electronic components may be affixed to a motherboard 100 and are subject to power management as described in relation to previous figures. As such, these electronic components are subject to current and/or voltage transitions as one or more electronic components in the multi-processor system 600 are transitioned from one power state to another. To that end, the electronic components shown here in FIG. 8 may vibrate and cause a motherboard 100 to vibrate thereby generating acoustic noise. Pursuant to the earlier discussion provided in relation to FIGS. 4 and 5, these electronic components and the multi-processor system 800 as a whole may be subject to monitoring by way of one or more sensors 400. Accordingly, acoustic noise measurements may be obtained by the sensors and provided as input to a power management unit 110 such that a clock modifier 112 for the power management unit 110 may appropriately disrupt a periodicity for the electronic components and/or the multi-processor system 600 at large by way of one or more modified control signals.

The following clauses and/or examples pertain to further embodiments. One example embodiment may be an apparatus comprising a processor including a power control unit having logic to cause at least one core of the processor to transition to a new power state after a random time interval if an acoustic noise measurement exceeds an acoustic noise threshold. The power control unit may include logic to cause the at least one core processor further to transition to the new power state after a fixed time interval if the acoustic noise measurement does not exceed the acoustic noise threshold. The fixed time interval may correspond to a time between clocks for the processor. The power control unit may include logic to cause the at least one core processor further to determine the random time interval based on a fixed time interval and an offset, such that the fixed time interval corresponds to a time between clock ticks for the processor. The power control unit may include logic to cause the at least one core processor further to disrupt the periodicity of power state transitions for the processor by transitioning the processor to the new power state after the random time interval. The power control unit may include logic to cause the at least one core processor further to obtain a measurement for acoustic noise generated by one or more electronic components coupled to the processor on the motherboard. The power control unit may include logic to cause the at least one core processor further to sample an acoustic noise generated by one or more electronic components on a motherboard. The acoustic noise threshold may be determined based on a frequency for the sampled acoustic noise. The power control unit may include logic to cause the at least one core processor further to sample an acoustic noise generated by one or more electronic components on a motherboard coupled to the processor. The offset may be determined based on a frequency for the sampled acoustic noise. The acoustic noise threshold may be one or more selected from the group including frequency values, vibration values, tonality values, voltage transitions, current transitions, and sound pressure values.

In another example embodiment, a method may include determining a fixed time interval corresponding to a time between clock ticks. A random time interval may be determined based on the fixed time interval and an offset. An electronic component on a motherboard for a computing device may be transitioned to a new power state when the random time interval has elapsed. Transitioning the electronic component on the motherboard for the computing device to the new power state when the random time interval has elapsed may include disrupting a periodicity of power state transitions for the electronic component. Transitioning the electronic component on the motherboard for the computing device to the new power state when the random time interval has elapsed may include spreading an acoustic noise generated by the electronic component over more frequencies. A measurement for acoustic noise generated by one or more electronic components on a motherboard may be obtained. It may be determined that the measurement exceeds an acoustic noise threshold. Based on the measurement exceeding the acoustic noise threshold, the electronic component may be transitioned to the new power stat when the random time interval has elapsed.

In another example embodiment, a system may include a dynamic random access memory device and at least one electronic component coupled to the dynamic random access memory device. The at least one electronic component may receive electrical current or voltage from a power supply. The system may include a power management unit to manage power state transitions for the at least one electronic component. The power management unit may determine a fixed time interval corresponding to a time between clock ticks, determine a random time interval based on the fixed time interval and an offset, and transition the at least one electronic component to a new power state when the random time interval has elapsed. The system may include one or more sensors to obtain an acoustic noise measurement. The power management unit may receive an acoustic noise measurement input obtained using the one or more sensors and determine whether the acoustic noise measurement input exceeds an acoustic noise threshold. The power management unit may, based upon a determination that the acoustic noise measurement input exceeds the acoustic noise threshold, generate an interrupt. The interrupt may include the modified timing input to transition the at least one electronic component to the new power state when the random time interval has elapsed. The power management unit may, based upon a determination that the acoustic noise measurement input does not exceed the acoustic noise threshold, generate an interrupt to transition the at least one electronic component to the new power state when the fixed time interval has elapsed. The at least one electronic component is transitioned to the new power state when the random time interval has elapsed to disrupt the periodicity of power state transitions for the at least one electronic component. The at least one electronic component is transitioned to the new power state when the random time interval has elapsed to spread the acoustic noise generated by the at least one electronic component over a more frequencies. The power management unit may modify the acoustic noise threshold dynamically based on a frequency determined for acoustic noise.

Another example embodiment may include at least one machine readable medium storing a plurality of instructions that, in response to being executed on a computing device, cause the computing device to determine a fixed time interval corresponding to a time between clock ticks, determine a random time interval based on the fixed time interval and an offset, and transition an electronic component on a motherboard for a computing device to a new power state when the random time interval has elapsed.

While a limited number of embodiments have been expressly described herein, those skilled in the art will appreciate numerous modifications and variations therefrom. It is intended that the appended claims cover all such modifications and variations as fall within the true spirit and scope of the described embodiments.

What is claimed is:

1. A processor comprising:
   at least one core; and
   a power control unit having logic to cause the at least one core to:
      transition to a new power state after a random time interval in response to an acoustic noise measurement that exceeds an acoustic noise threshold;
      determine an offset based on a fixed time interval;
      determine a time interval range based on the fixed time interval and the offset; and
      determine the random time interval based on the time interval range, the fixed time interval corresponding to a time between clock ticks for the processor.

2. The processor of claim 1, wherein the power control unit having logic to cause the at least one core further to:
    transition to the new power state after the fixed time interval in response to the acoustic noise measurement not exceeding the acoustic noise threshold.

3. The processor of claim 1, wherein the power control unit having logic to cause the at least one core further to:
    disrupt a periodicity of power state transitions for the processor by transitioning the processor to the new power state after the random time interval.

4. The processor of claim 1, wherein the power control unit having logic to cause the at least one core further to:
    obtain the acoustic noise measurement for acoustic noise generated by one or more electronic components coupled to the processor on a motherboard.

5. The processor of claim 1, wherein the power control unit having logic to cause the at least one core of the processor further to:
    sample an acoustic noise generated by one or more electronic components on a motherboard, the processor coupled to the motherboard; and
    determine the acoustic noise threshold based on a frequency for the sampled acoustic noise.

6. The processor of claim 1, wherein the power control unit having logic to cause the at least one core further to:
    sample an acoustic noise generated by one or more electronic components on a motherboard coupled to the processor; and
    determine the offset based on a frequency for the sampled acoustic noise.

7. The processor of claim 1, wherein the acoustic noise threshold is one or more selected from the group consisting of frequency values, vibration values, tonality values, voltage transitions, current transitions and sound pressure values.

8. The processor of claim 1, further comprising a sensor to measure the acoustic noise.

9. A method, comprising:
    determining a fixed time interval corresponding to a time between clock ticks;
    determining an offset based on the fixed time interval;
    determining a time interval range based on the fixed time interval and the offset;
    determining a random time interval based on the time interval range; and
    transitioning an electronic component for a computing device to a new power state when the random time interval has elapsed.

10. The method of claim 9, wherein transitioning the electronic component for the computing device to the new power state when the random time interval has elapsed comprises disrupting a periodicity of power state transitions for the electronic component.

11. The method of claim 9, wherein transitioning the electronic component for the computing device to the new power state when the random time interval has elapsed comprises spreading an acoustic noise generated by the electronic component over a plurality of frequencies.

12. The method of claim 9, further comprising:
    obtaining a measurement for acoustic noise generated by the electronic component.

13. The method of claim 12, further comprising:
    determining that the measurement exceeds an acoustic noise threshold; and
    based on the measurement exceeding the acoustic noise threshold, transitioning the electronic component to the new power state when the random time interval has elapsed.

14. A system, comprising:
    a dynamic random access memory device;
    one or more sensors to obtain an acoustic noise measurement;
    at least one electronic component coupled to the dynamic random access memory device, the at least one electronic component to receive electrical current from a power supply;
    a power management unit to manage power state transitions for the at least one electronic component, the power management unit to:
        determine a fixed time interval corresponding to a time between clock ticks;
        determine an offset based on the fixed time interval;
        determine a time interval range based on the fixed time interval and the offset;
        determine a random time interval based on the time interval range;
        receive an acoustic noise measurement input obtained using the one or more sensors;
        determine whether the acoustic noise measurement input exceeds an acoustic noise threshold; and
        responsive to a determination that the acoustic noise measurement input exceeds the acoustic noise threshold, transition the at least one electronic component to a new power state when the random time interval has elapsed.

15. The system of claim 14, wherein the power management unit is further to:
    based upon the determination that the acoustic noise measurement input exceeds the acoustic noise threshold, generate an interrupt comprising a modified timing input to transition the at least one electronic component to the new power state when the random time interval has elapsed.

16. The system of claim 14, wherein the power management unit is further to:
    based upon a determination that the acoustic noise measurement input does not exceed the acoustic noise threshold, generate an interrupt to transition the at least one electronic component to the new power state when the fixed time interval has elapsed.

17. The system of claim 14, wherein the at least one electronic component is to transition to the new power state when the random time interval has elapsed to disrupt the periodicity of power state transitions for the at least one electronic component.

18. The system of claim 14, wherein the at least one electronic component is to transition to the new power state when the random time interval has elapsed to spread acoustic noise generated by the at least one electronic component over a plurality of frequencies.

19. The system of claim 14, wherein the power management unit is further to modify the acoustic noise threshold dynamically based on a frequency determined for acoustic noise.

* * * * *